(12) United States Patent
Rodriguez Ramirez

(10) Patent No.: US 10,753,428 B2
(45) Date of Patent: Aug. 25, 2020

(54) DEVICE, TRANSMISSION, AND UNIVERSAL MECHANICAL COUPLING OF FORCES HAVING DIFFERENT MAGNITUDES AND DIRECTION (D.T.U.M.C.)

(71) Applicant: Marco Antonio Rodriguez Ramirez, Las Palmas de Gran Canaria (ES)

(72) Inventor: Marco Antonio Rodriguez Ramirez, Las Palmas de Gran Canaria (ES)

(*) Notice: Subject to any disclaimer, the term of this patent is extended or adjusted under 35 U.S.C. 154(b) by 986 days.

(21) Appl. No.: 15/304,080

(22) PCT Filed: Apr. 10, 2015

(86) PCT No.: PCT/ES2015/070284
§ 371 (c)(1),
(2) Date: Nov. 3, 2016

(87) PCT Pub. No.: WO2015/158946
PCT Pub. Date: Oct. 22, 2015

(65) Prior Publication Data
US 2017/0045119 A1 Feb. 16, 2017

(30) Foreign Application Priority Data
Apr. 14, 2014 (ES) ............... 201400353 U

(51) Int. Cl.
| F16H 3/10 | (2006.01) |
| F16H 3/00 | (2006.01) |
| F03B 13/14 | (2006.01) |
| F03B 13/22 | (2006.01) |
| F16H 37/02 | (2006.01) |

(52) U.S. Cl.
CPC ............ *F16H 3/003* (2013.01); *F03B 13/14* (2013.01); *F03B 13/142* (2013.01); *F03B 13/22* (2013.01); *F16H 3/10* (2013.01); *F16H 37/02* (2013.01); *F05B 2260/4022* (2013.01); *F05B 2260/4031* (2013.01); *Y02E 10/32* (2013.01); *Y02E 10/38* (2013.01)

(58) Field of Classification Search
CPC ........ F03B 13/14; F03B 13/142; F03B 13/22; F16H 3/10; F16H 37/02; F05B 2260/4022; F05B 2260/4031
USPC .............................. 74/810.1; 60/504; 290/53
See application file for complete search history.

(56) References Cited

U.S. PATENT DOCUMENTS

| 3,408,878 A | * | 11/1968 | Bertao | ................... | F16H 31/001 |
| | | | | | 74/126 |
| 4,122,676 A | * | 10/1978 | Kikut | .................... | F03B 13/183 |
| | | | | | 290/53 |

(Continued)

OTHER PUBLICATIONS

International Search Report of the PCT dated Jun. 16, 2015.

*Primary Examiner* — William C Joyce
(74) *Attorney, Agent, or Firm* — Reising Ethington P.C.

(57) ABSTRACT

A device, transmission and universal mechanical coupling which allows transforming rotating forces of different magnitudes and directions being applied on the same rotating shaft (1) and obtaining a unidirectional motion in an output shaft (2) which can be used in any environment. The device consists of an input shaft (1), an output shaft (2) and two linking means (3 and 5) and (4, 9, and 6) between these two shafts (1 and 2) which are provided with at least a unidirectional coupling device (7a and 7b) each, and which, in the most basic form thereof lacks of a rotation inverter (15a).

3 Claims, 8 Drawing Sheets

(56) References Cited

U.S. PATENT DOCUMENTS

| | | | |
|---|---|---|---|
| 4,145,885 A | 3/1979 | Solell | |
| 4,311,435 A | 1/1982 | Bergero | |
| 4,389,843 A * | 6/1983 | Lamberti | F03B 13/1815 |
| | | | 290/42 |
| 5,931,062 A * | 8/1999 | Marcovici | B25B 13/467 |
| | | | 81/177.2 |
| 7,862,292 B2 * | 1/2011 | Patterson | F03B 13/1865 |
| | | | 415/123 |
| 8,413,547 B2 * | 4/2013 | Yang | F16H 3/003 |
| | | | 475/12 |
| 9,016,055 B2 * | 4/2015 | Dragic | F03B 13/1855 |
| | | | 60/504 |
| 2003/0034627 A1 * | 2/2003 | Kim | B62M 1/36 |
| | | | 280/237 |
| 2009/0211240 A1 * | 8/2009 | Patton | F03B 13/1865 |
| | | | 60/498 |
| 2009/0066085 A1 | 12/2009 | Gray | |
| 2012/0036959 A1 * | 2/2012 | Chen | B62M 11/04 |
| | | | 74/810.1 |
| 2012/0085200 A1 * | 4/2012 | Yang | B62M 9/00 |
| | | | 74/810.1 |

* cited by examiner

DEVICE, TRANSMISSION, AND UNIVERSAL MECHANICAL COUPLING OF FORCES HAVING DIFFERENT MAGNITUDES AND DIRECTION (D.T.U.M.C.)

OBJECT OF THE INVENTION

The object of the present invention is to couple rotational forces of different magnitudes and directions on a same rotational axis, and to obtain a unidirectional motion in an output shaft.

FIELD OF THE INVENTION

The main field of application of this patent is the electrical industry, but it is tightly related to the mechanical industry. It has to be considered that the uses thereof are several. For example, it can be used as a converter of linear motion into rotational motion.

BACKGROUND

There are different patent applications, several patent specifications and several utility models that use transmission systems coupling bi-directional motion so as to obtain a unidirectional motion in an output shaft. For example, for conversion of different direction motion in which wave-energy may flow.

Patent WO2009101085A2 can be found among these, disclosing a device for converting a bidirectional rotation motion around two axes or two rotation axes into a unidirectional rotation motion around a single rotation axis. U.S. Pat. No. 6,247,308 describes a transmission device converting a rotary motion around a first axis into a rotary motion around a second axis, being perpendicular to the first axis.

There are also several patents and utility models which can use these transmissions or others, and which use buoys so as to harvest the energy from the waves, such as, for example, patent WO2008031549 A1, patent WO2012152289A2 and patent application WO2011126451A1, etc.

A drawback that unidirectional systems and devices using this type of transmissions feature is that, when in a coupling or unidirectional rotation device, such as free wheels, pawls, or coupling bearings, there is a rotation in the opposite direction in which it is locked, certain instability is produced in the system or in the object which may cause problems, for example, if a turbine is not working in a liquid fluid such as water and uses this type of transmissions, when this (turbine) is freely rotating, it will do so in an uncontrolled manner, causing some trouble.

In order to harvest wave-motion so as to generate electricity, OWCs (Oscillating Water Columns) are also employed, which use bi-directional turbines such as, for example, turbines of the Wells type, wherein these turbines have blades which rotate in order to place said blades in a suitable position depending on the direction of the fluid moving them.

The author of this patent does not know of any use of a turbine which, realizing different forces or motions of different magnitudes and directions applied on a same rotating axis, this achieves a unidirectional motion in the fashion described above, in an output shaft without using the blades rotation or the like.

DESCRIPTION

The present invention basically discloses a transmission system having an input axis, on which there can be applied different direction movements and forces and different magnitudes (for example, bi-directional movements produced by waves), and the conversion of these movements in other movements in a single direction, transmitted to an output shaft. It is a coupling unit which can be formed as a coupling and/or transmission device, or as a transmission system.

Mainly, the object is distinguished because it has:
a) An input shaft which can be a multiple or a compound one. (Shafts, etc.)
b) An output shaft which can be a multiple or a compound one. (Shafts, etc.)
c) At least two coupling or unidirectional rotation devices or mechanisms, such as free wheels, pawl mechanisms, coupling bearings, racks, etc.
d) The transmission means being required for linking the two shafts (the input and the output one). For example, gears, cogged wheels, belts, driving chains, etc.
e) A transmission outer casing which does not have to be a requirement, but which may be used for protecting said coupling or transmission from the environment where it is located, for example, a water tight box if said transmission is offshore.

The outer casing can also be used for fixing the elements and for commercialization thereof, forming a universal use object.

BRIEF DESCRIPTION OF THE DRAWINGS

In order to provide a better understanding of the present utility model and operation thereof, a set of figures is provided showing in a basic and general way, examples of different embodiments thereof and of use of the object, although said examples do not represent any limitation at all regarding configuring the object in a different way to that being shown herein. Said figures are not to scale, for a better identification of the components integrating them.

DESCRIPTION OF AN EMBODIMENT (FIG. 1)

Figure 1:
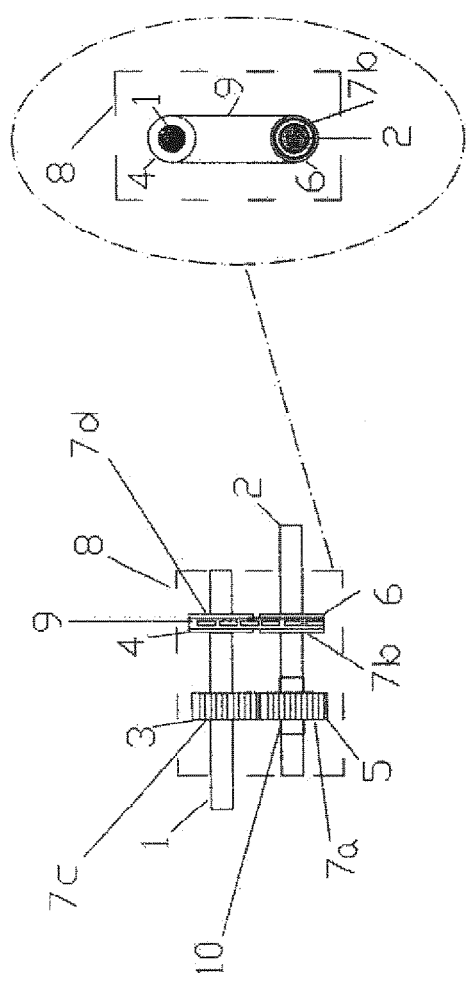
FIGS. 1, 2, 3 and 4 show a perspective view of four different configurations of the object, showing basic configurations and more complex configurations.

This embodiment shows the basic minimum way of forming the object. This consists of configuring this coupling unit by means of a mixed linkage between two shafts (1,2), without using rotation inverters.

Transmission means (3 and 5) and (4, 9 and 6) are placed starting from an input shaft (1) up to the output shaft (2).

For further detail of this embodiment, in an input shaft (1) two elements are placed being suitable for transmitting the motion taking place in said shaft (1), in this case, a cogged wheel (3) or gear, and also, at a minimum required distance, a pulley or another cogged wheel, or a pinion gear (4) is situated therein.

A cogged wheel (5) and another cogged wheel having a pinion gear (6) are placed at an output shaft (2), to which a rotation or unidirectional driving mechanism is coupled, in this case, consisting of two free wheel (7a and 7b) mechanisms. These unidirectional rotation or driving mechanisms (7a and 7b) are placed such that both apply a force on the shaft they are on, in the same direction in which the output shaft is intended to be rotated.

Briefly, we can say that a unidirectional coupling device, as that being referred to, is a device which is locked when a force is applied in one direction, and which is not locked, freely rotating, when a force is applied in a direction opposite to the previous one.

For this embodiment the motion transmission between (3) and (5) is a direct one, and for (4) and (6) this is done by means of a chain (9), although this can be a driving chain, rack elements or other, depending on the transmission means.

Operation is as follows: when on the input shaft (1) a rotational force is applied in one direction, the cogged wheel (3) transmits the movement to the other cogged wheel (5) causing the output shaft (2) to rotate in a direction opposite to the that of the input shaft (1).

For example, if the input shaft (1) rotates towards the right the output shaft (2) will rotate towards the left.

When the input shaft (1) is rotated towards the left, this will move the cogged wheel or pinion gear (4), transmitting the movement through the chain (9) up to the pinion gear (6) thus moving the output shaft (2) also towards the left.

In another embodiment, other two unidirectional rotation mechanisms, located, one (7c) in the cogged wheel (3), so that the internal ring of the free wheel locks in the same direction as the internal rings from the unidirectional rotation mechanisms (7a and 7b), and another (7d) located at the pinion (4), such that the internal ring locks in the different direction as the internal rings from the unidirectional rotation mechanisms (7a and 7b), avoiding unnecessary friction between the cogged wheels (3 and 5), improving yield and avoiding movements or displacements which are also unnecessary.

In order to obtain a better fixing of the unidirectional rotation mechanisms, located in the transmission elements, to the shafts, and so as to be able to move these along said shafts, a third element having a tubular shape (10) can be used which will be fixed between the shaft and the internal ring of the free wheel mechanisms; with grooved means, key slots, stud bolts, etc.

DESCRIPTION OF AN EMBODIMENT (FIG. 2)

For this embodiment, the transmission means (4, 6 and 9) is substituted by a transmission gear assembly such as cogged wheels (3a and 5a), and also a rotation inverter (15a) is used.

DESCRIPTION OF AN EMBODIMENT (FIG. 3)

Figure 2:
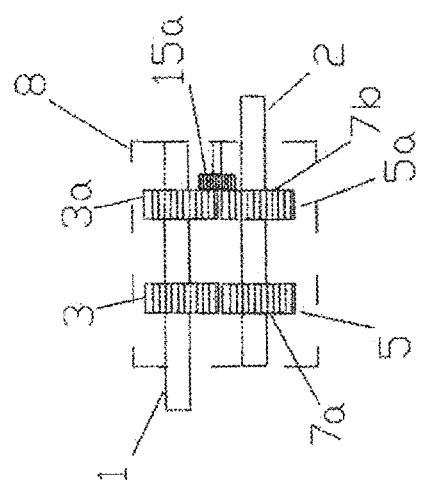
Figure 3:
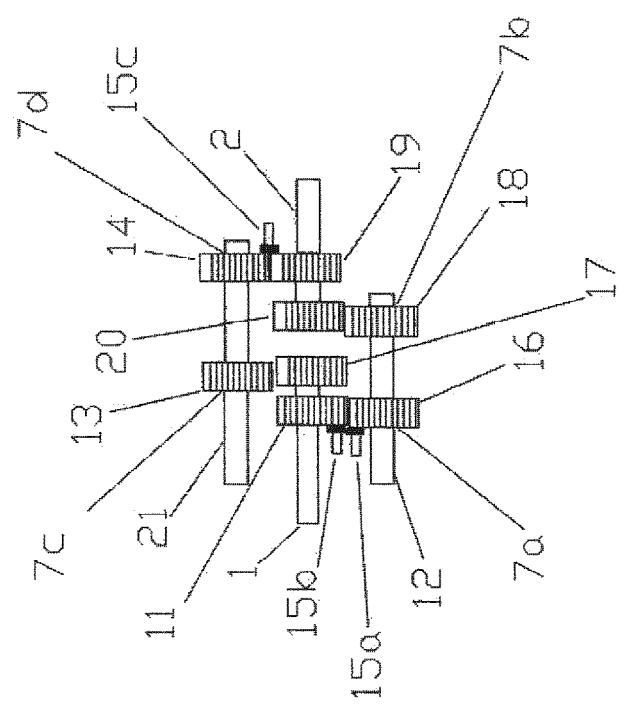

In another embodiment, the manner in which movement is transmitted from the input shaft (1) to the output shaft (2) is by using a transmission shaft (12 and 21) for each direction in which the input shaft (1) rotates, and linking those shafts to the input shaft (1) by means of a set of cogged wheel (12, 17) gears for one of the directions, and, (11, 15a and 16) for the other rotation direction, wherein (15a) there is a rotation inverter similar to that of FIG. 2.

In this embodiment, each of the transmission shafts (12 and 21), are linked to the output shaft (2) through a direct transmission means, such as, for example, two cogged wheels (14 and 18) which will move, in the way described in the figure, the cogged wheels (19 and 20), which are in the output shaft (2).

It should be taken into account that:
a) At least one of the elements of each of the gear sets (13 and 17), (11, 15a and 16), (18 and 20) and (14 and 19) could have, at least one coupling or unidirectional rotation mechanism, such as a free wheel (7a, . . . ).
b) Each of the transmission gear sets (17 and 13) and (11, 15a and 16) can be provided with a rotation inverter (as well as the one it already has, 15b and 15c and 15d).
c) That in the input shaft (1) one of the cogged wheels from the transmission means can be removed, for example (17), and that the cogged wheels (13 and 16) of the transmission shafts (12 and 21) move the cogged wheel (11).
d) That in the output shaft (2) one of the cogged wheels of the transmission means, for example (20) can be removed, and that the cogged wheels (14, and 18) of the transmission shafts (12 and 21) move the cogged wheel (19), with the respective inverters, if any.

DESCRIPTION OF AN EMBODIMENT (FIG. 4)

Figure 4:
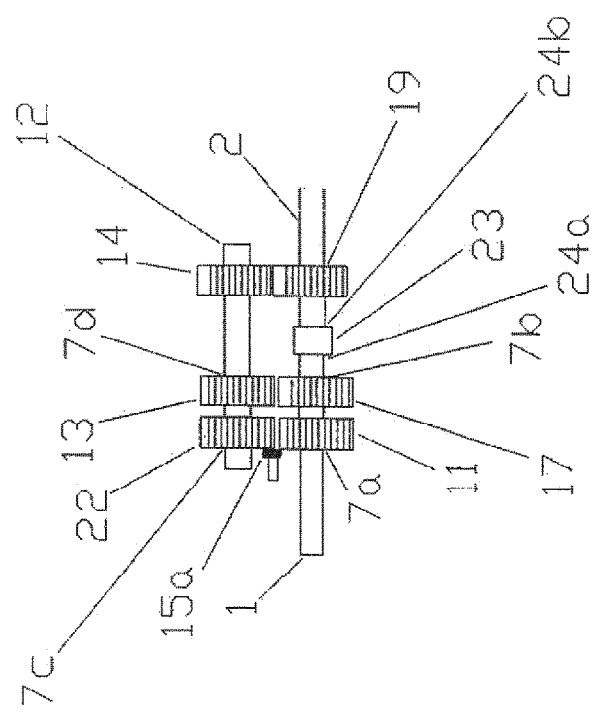

FIG. 4 shows another embodiment of the object of the invention, in this case with one of the transmission shafts (12) being removed, with respective links (15a and 16), and (18 and 20) to the input (1) and output (2) shafts.

In this embodiment, a cogged wheel has been added (22) which will be linked to the cogged wheel (11) by means of a rotation inverter (15a), In this embodiment, the input shaft (1) is linked to the output shaft (2) by means of a tubular hollow shaft or a driving shaft (23), although it can be a cardan shaft. This driving shaft is provided, at each one of the ends thereof, with a bush or idler bearing (24a and 24b), such that the outer rings thereof are coupled to the shaft (23), wherein one (24a) of the inner rings of each of the bearings is joined to the input shaft (1), and the other (24b) to the output shaft (2).

DESCRIPTION OF AN EMBODIMENT (FIG. 5)

This embodiment shows a possible application of the object. Thereby, generally, the Device. Transmission and Universal Mechanical Coupling of Forces of different magnitude and Directions will be referred to as D.T.A.M.U. (for its Spanish acronym), and it will be referenced under number (28).

In this embodiment, as an example of application of D.T.A.M.U (28), a driving element being placed serially can be used, such as a turbine, rotor, propellers, wheels that can be from mills or devices similar to all the above, independently and/or being integrated in an wind turbine, in an O.W.C. or others. For this embodiment, the D.A.T.M.U is integrated in a wind turbine (29).

For this embodiment, a turbine (25) connected to a multiplier (26) is coupled to the input shaft (1) of the D.T.A.M.U. (28), and the output shaft (2) of the D.T.A.M.U. (28) is coupled to an electric generator (27).

The output shaft (2) can be the shaft of the electric generator or the shaft of what we are going to move.

DESCRIPTION OF AN EMBODIMENT (FIG. 6)

Figure 5:
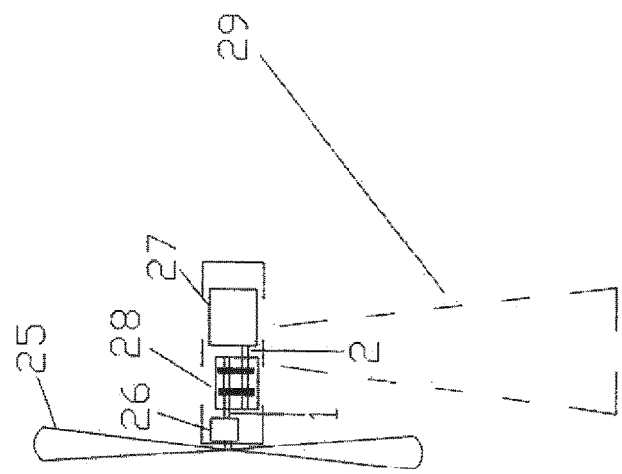
FIGS. 5, 6, 7 and 8 show a perspective view of the different ways of forming an electric generation object.
Figure 6:
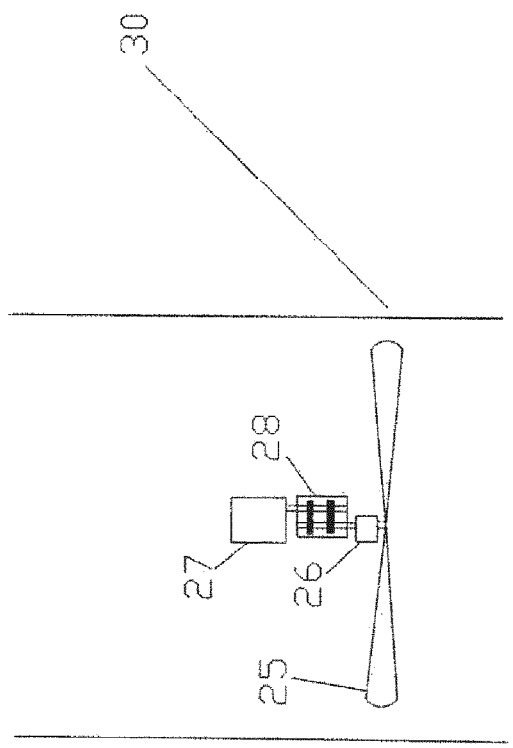
Figure 7:
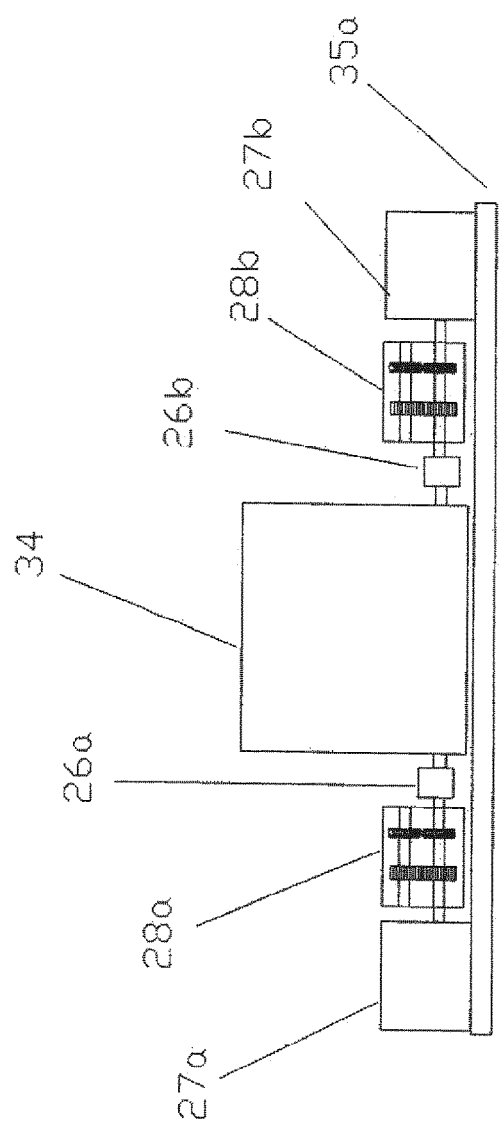
Figure 8:
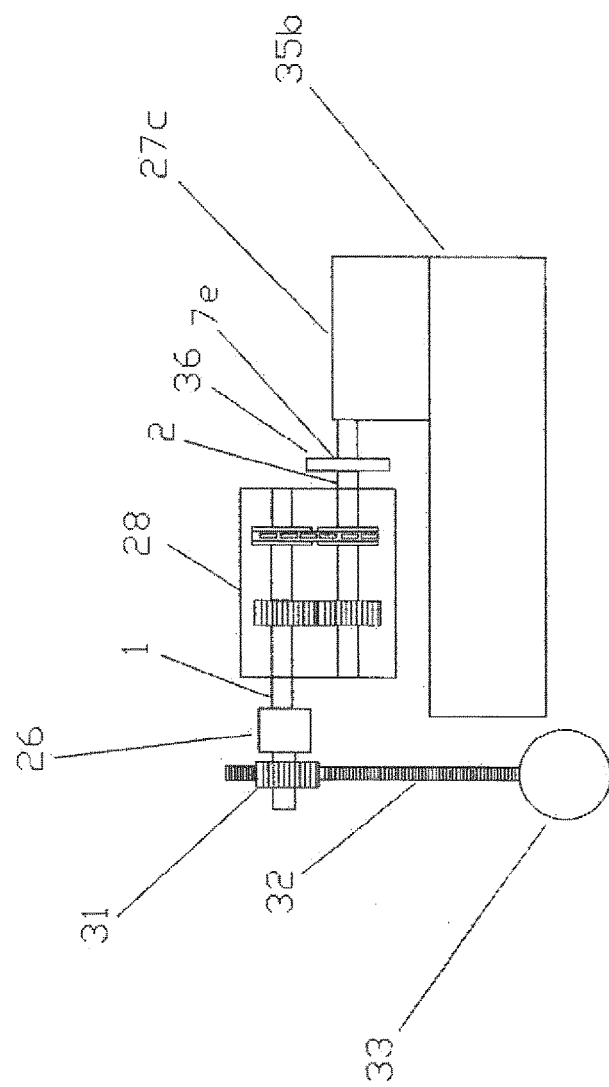

This embodiment is similar to that of FIG. 5, with the difference that the D.T.A.M.U. (28) is integrated in an OWC (Oscillating Water Column). FIG. 6 shows a drawing thereof inside a wave flow collector (30).

DESCRIPTION OF AN EMBODIMENT (FIG. 7)

This figure shows an adaptation of D.T.A.M.U. (28) to a driving element such as blades, wings (34) or the like, floating, submerged or partially submerged, which may be part of a power generating system situated in a floating platform (35a) anchored to the seabed, or in a fixed platform.

In this embodiment, a driving element such as a wing (34) is coupled a power generating unit consisting of a multiplier (26a), a D.T.A.M.U. (28a) and an electric generator (27a) at one end, and another power generating unit consisting of a multiplier (26b), a D.T.A.M.U. (28b) and an electric generator (27b).

DESCRIPTION OF AN EMBODIMENT (FIG. 8)

In this embodiment, the D.T.A.M.U. (28) is fitted into a driving element such as a buoy (33), float or the like, which can be part of a power generating system situated in a floating platform (35b), either anchored or fixed.

In this embodiment, at least a driving element such as a buoy (33) which may have, or be attached to, a counterweight which can be a block (not shown in the drawings), transmits motion by means of a rack element, such as a rack bar (32), to a cogged wheel (31) being coupled to a multiplier (26), which in turn is coupled to the input shaft (1) of the D.A.T.M.U.

In this embodiment, a flywheel (36) having a unidirectional rotation mechanism (7e) is coupled to the output shaft (2), such that the inner ring of said unidirectional mechanism is coupled to the output shaft (2) and the outer ring of said mechanism is coupled to or fitted into the inner ring of the flywheel (36).

For this embodiment, the unit described above is also connected to an electric generator (27c).

GENERALITIES

There are a number of generalities which can be applied to the above described figures:
a) Unidirectional coupling devices may be placed as appropriate; for example in FIG. 1, if only two unidirectional rotation mechanisms are used, there can only be (7b and 7c).
b) For the D.T.A.M.U. (28) configuration, a combination of the means described being used. For example, in FIG. 4, the transmission assembly (22, 15a, 11) may be substituted by assembly (4,6 and 9).
c) These transmission means may act as speed multipliers; by adjusting the cogged wheels size, using crowns, etc.
d) The transmission means may have at least a unidirectional rotation element.
e) The locking positions for the actuating or unidirectional rotation mechanisms may vary.

The invention claimed is:
1. Device, transmission and universal mechanical coupling of forces of different magnitude and directions characterized in that it comprises one input shaft wherein force is applied, and an output shaft transmitting motion, comprising two transmission means so as to move the input and output shafts with respect to one another, and wherein one of the transmission means being used comprises two gears (3,5) of cogged wheels, which invert the rotation direction between the two shafts (1,2), while the other transmission means used comprises two pinion gears (4,6) having a driving chain (9), so as to move the two shafts (1,2) in the same direction, having four unidirectional coupling devices (7a, 7b, 7c, 7d) located between the gears and the shafts, such that the cogged wheel transmission means, reversing the rotation direction between the two shafts, has two of the unidirectional coupling devices placed in parallel with respect to each other (7c, 7a), one on each shaft, and arranged so as to lock in the same rotation direction, whereas the pinion chain transmission means moving both shafts in the same rotation direction, has two of the unidirectional coupling devices placed in parallel with respect to each other (7d, 7b), one on each shaft, arranged so as to lock in a direction opposite to the rotation direction, one with respect to the other; and also, the unidirectional coupling devices (7a, 7b) which are on the output shaft, lock in the same rotation direction one with respect to the other.

2. Device, transmission and universal mechanical coupling of forces of different magnitude and directions according to claim 1, characterized in that each one of the two transmission means used to move one shaft with respect to the other, has two of the unidirectional coupling device, one on each shaft, and arranged such that they lock in the same rotation direction; wherein the driving chain coupled to the input shaft and the driven elements coupled to the output shaft, directly or serially at one of the ends of the input or output shaft respectively, or using a transmission element featuring a removable coupling direct transmission between the shafts and the driving chain.

3. Device, transmission and universal mechanical coupling of forces of different magnitude and directions according to claim 1 characterized in that the input shaft has a driven gear (31) or a pulley.

\* \* \* \* \*